United States Patent
Fujiwara et al.

(10) Patent No.: US 7,643,654 B2
(45) Date of Patent: Jan. 5, 2010

(54) IMAGE PROCESSING APPARATUS, DISTANT VIEW IMAGE DISPLAY METHOD, AND DISTANT VIEW IMAGE DISPLAY PROGRAM

(75) Inventors: Akihito Fujiwara, Tokyo (JP); Yasuhiro Hayashida, Tokyo (JP)

(73) Assignee: Sega Corporation, Tokyo (JP)

( * ) Notice: Subject to any disclaimer, the term of this patent is extended or adjusted under 35 U.S.C. 154(b) by 745 days.

(21) Appl. No.: 11/487,615

(22) Filed: Jul. 17, 2006

(65) Prior Publication Data

US 2007/0019840 A1    Jan. 25, 2007

(30) Foreign Application Priority Data

Jul. 19, 2005   (JP) .............................. 2005-208758

(51) Int. Cl.
G06K 9/00 (2006.01)
B60Q 1/00 (2006.01)
B60T 7/12 (2006.01)

(52) U.S. Cl. .......................... 382/104; 340/435; 701/96

(58) Field of Classification Search ................. 382/104; 340/435, 477, 686.6, 901, 902, 903, 904, 340/933, 988, 992; 701/28, 96
See application file for complete search history.

(56) References Cited

U.S. PATENT DOCUMENTS 5,301,239 A * 4/1994 Toyama et al. .............. 382/104
5,530,420 A * 6/1996 Tsuchiya et al. ............ 340/435
5,687,249 A * 11/1997 Kato ........................ 382/104

FOREIGN PATENT DOCUMENTS

| JP | 09 237037 A | 9/1997 |
| JP | 10 307034 A | 11/1998 |
| JP | 2001-27532 | 1/2001 |
| JP | 2001-83872 | 3/2001 |

\* cited by examiner

Primary Examiner—Abolfazl Tabatabai
(74) Attorney, Agent, or Firm—Ladas & Parry LLP

(57) ABSTRACT

An image processing apparatus is disclosed that displays a three-dimensional map including displays of a road and a three-dimensional building on a display unit. The image processing apparatus includes a managing unit that divides bearings into a predetermined number of bearing regions and manages identification information of a distant view pattern assigned to each of the bearing regions for each of a plurality of locations, an acquisition unit that acquires identification information of the distant view pattern assigned to each of the bearing regions for a current location, and a depiction unit that depicts a background image behind a display area for displaying the road and the building based on the acquired identification information of the distant view pattern.

7 Claims, 9 Drawing Sheets

| ID | PREFECTURE | EB PATTERN | | | | | | | |
|----|------------|---|---|---|---|---|---|---|---|
| 1 | HOKKAIDO | 0 | 0 | 0 | 0 | 0 | 0 | 0 | 0 |
| 2 | AOMORI | 0 | 0 | 0 | 2 | 1 | 2 | 0 | 0 |
| 3 | AKITA | 2 | 1 | 1 | 2 | 0 | 0 | 0 | 0 |
| 4 | IWATE | 0 | 0 | 0 | 0 | 2 | 1 | 1 | 2 |
| ⋮ | ⋮ | ⋮ | ⋮ | ⋮ | ⋮ | ⋮ | ⋮ | ⋮ | ⋮ |
| 13 | IBARAKI | 0 | 0 | 0 | 2 | 2 | 2 | 2 | 2 |
| 14 | TOKYO | 2 | 2 | 0 | 0 | 0 | 2 | 2 | 2 |
| 15 | KANAGAWA | 2 | 0 | 0 | 0 | 2 | 2 | 3 | 2 |
| 16 | YAMANASHI | 1 | 2 | 1 | 2 | 3 | 2 | 1 | 2 |
| ⋮ | ⋮ | ⋮ | ⋮ | ⋮ | ⋮ | ⋮ | ⋮ | ⋮ | ⋮ |
| 45 | KUMAMOTO | 1 | 2 | 1 | 2 | 1 | 2 | 2 | 1 |
| 46 | KAGOSHIMA | 1 | 2 | 0 | 0 | 0 | 0 | 2 | 2 |
| 47 | OKINAWA | 2 | 0 | 0 | 0 | 0 | 0 | 0 | 0 |
|  |  |  |  |  |  |  |  |  |  |

FIG.3

| ID | CITY | EF PATTERN | | | | | | | | | | | | | | | |
|---|---|---|---|---|---|---|---|---|---|---|---|---|---|---|---|---|---|
| ... | ... | ... | ... | ... | ... | ... | ... | ... | ... | ... | ... | ... | ... | ... | ... | ... | ... |
| 1100 | MEGURO | ... | 1 | 1 | 1 | 1 | 1 | 1 | 1 | 4 | 1 | 1 | 1 | 1 | 1 | 1 | ... |
| 1101 | OTA | ... | 1 | 1 | 1 | 0 | 1 | 0 | 2 | 0 | 2 | 0 | 0 | 1 | 1 | 1 | ... |
| 1102 | SETAGAYA | ... | 1 | 1 | 1 | 1 | 1 | 1 | 1 | 4 | 1 | 1 | 1 | 1 | 1 | 1 | ... |
| 1103 | SHIBUYA | ... | 1 | 4 | 4 | 1 | 1 | 1 | 1 | 1 | 4 | 4 | 1 | 1 | 1 | 1 | ... |
| ... | ... | ... | ... | ... | ... | ... | ... | ... | ... | ... | ... | ... | ... | ... | ... | ... | ... |

T2

FIG.9
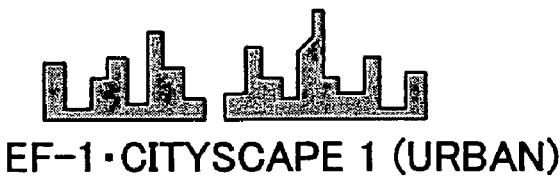
EF-1·CITYSCAPE 1 (URBAN)
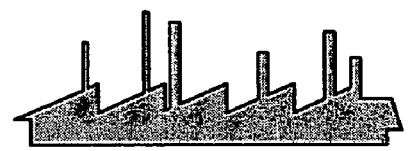
EF-2·CITYSCAPE 2 (INDUSTRIAL)
EF-3·FOREST SCENE 1 (EVERGREEN)
EF-4·FOREST SCENE 2 (DECIDUOUS)
⋮

IMAGE PROCESSING APPARATUS, DISTANT VIEW IMAGE DISPLAY METHOD, AND DISTANT VIEW IMAGE DISPLAY PROGRAM

BACKGROUND OF THE INVENTION

1. Field of the Invention

The present invention relates to an image processing apparatus that may be applied to a car navigation apparatus, for example, a distant view image display method, and a distant view image display program.

2. Description of the Related Art

A car navigation apparatus that displays the current position and/or the traveling direction of a subject vehicle on a map displayed on a display screen is becoming popular, and with the dramatic advancement of depiction technology, there is a growing demand for the adoption of a 3D (three-dimensional) map as the map for car navigation. It is noted that a 3D map for car navigation is configured to display roads as the main object along with 3D images of buildings.

It is noted that a map for car navigation is configured to depict a view of an area within a certain distance range from a subject vehicle, and in recent years and continuing, depicting a view from a high viewpoint to display a wide map area is becoming the mainstream display technique for car navigation. In this case, an upper portion of the display screen where the depiction of the map area ends is generally represented as a horizon. In most cases, a specific image for a depiction area extending beyond such a horizon is not provided, and a general image of the sky is often depicted in such a depiction area. It is noted that Japanese Laid-Open Patent Publication No. 2001-83872 discloses a technique relating to displaying a distant view image including mountains, clouds, and the sky, for example, at the upper side of the horizon. However, the specific mechanisms for realizing such a technique are not disclosed in the above document.

As can be appreciated, in a conventional car navigation apparatus, special considerations have not been made with regard to the depiction area extending beyond the horizon. However, with the adaptation of the 3D map, buildings are being represented in a more realistic manner, and in turn there is a growing demand for improvement in the quality of the background image being depicted in order to maintain a balance with the depicted buildings.

In this regard, a fixed distant view image of mountains, for example, may be prepared beforehand and depicted at the portion beyond the horizon. However, in this case, mountains may always be depicted even when an area that is not surrounded by mountains is displayed such as an area along the sea. This may create awkwardness in the displayed image. On the other hand, if a database of distant view images for every location were prepared and arranged to be reproduced accordingly, processing and operations may be burdensome. Moreover, such accurate distant views in car navigation are not necessary.

SUMMARY OF THE INVENTION

According to one aspect of the present invention, an imaging apparatus, a distant view image display method, and a distant view image display program are provided for depicting a distant image according to conditions of a given location point with a relatively small processing amount.

According to one embodiment of the present invention, an image processing apparatus is provided that displays a three-dimensional map including displays of a road and a three-dimensional building on a display unit, the apparatus including:

a managing unit that divides bearings into a predetermined number of bearing regions and manages identification information of a distant view pattern assigned to each of the bearing regions for each of a plurality of locations;

an acquisition unit that acquires identification information of the distant view pattern assigned to each of the bearing regions for a current location; and a depiction unit that depicts a background image behind a display area for displaying the road and the building based on the acquired identification information of the distant view pattern.

In one preferred embodiment, the distant view pattern has a dual structure including an outer circle distant view pattern and an inner circle distant view pattern.

In another preferred embodiment, a first division number into which bearings of the outer circle distant view pattern are divided differs from a second division number into which bearings of the inner circle distant view pattern are divided.

In another preferred embodiment, the outer circle distant view pattern includes an image of one or more mountains, and the inner circle distant view pattern includes an image of a cityscape.

In another preferred embodiment, the outer circle distant view pattern is arranged to correspond to a wide region in which the current location resides, and the inner circle distant view pattern is arranged to correspond to a region in which the current location resides.

According to another embodiment of the present invention, a distant view image display method is provided for displaying a three-dimensional map including displays of a road and a three-dimensional building on a display unit, the method including the steps of:

dividing bearings into a predetermined number of bearing regions and managing identification information of a distant view pattern assigned to each of the bearing regions for each of a plurality of locations;

acquiring the identification information of the distant view pattern assigned to each of the bearing regions for a current location; and depicting a background image behind a display area for displaying the road and the building based on the acquired identification information of the distant view pattern.

According to another embodiment of the present invention, a computer-readable medium is provided that stores a distant view image display program for displaying a three-dimensional map including displays of a road and a three-dimensional building on a display unit, the program being executed by an image processing apparatus to perform the steps of:

dividing bearings into a predetermined number of bearing regions and managing identification information of a distant view pattern assigned to each of the bearing regions for each of a plurality of locations;

acquiring the identification information of the distant view pattern assigned to each of the bearing regions for a current location; and depicting a background image behind a display area for displaying the road and the building based on the acquired identification information of the distant view pattern.

BRIEF DESCRIPTION OF THE DRAWINGS

FIG. 2 is a table representing an exemplary outer circle distant view pattern management table;

FIG. 3 is a table representing an exemplary inner circle distant view pattern management table;

FIG. 9 is a diagram showing examples of inner circle distant view patterns;

DETAILED DESCRIPTION OF THE PREFERRED EMBODIMENTS

In the following, preferred embodiments of the present invention are described with reference to the accompanying drawings. Specifically, the present invention is applied to a car navigation apparatus in the preferred embodiments described below.

Figure 1:
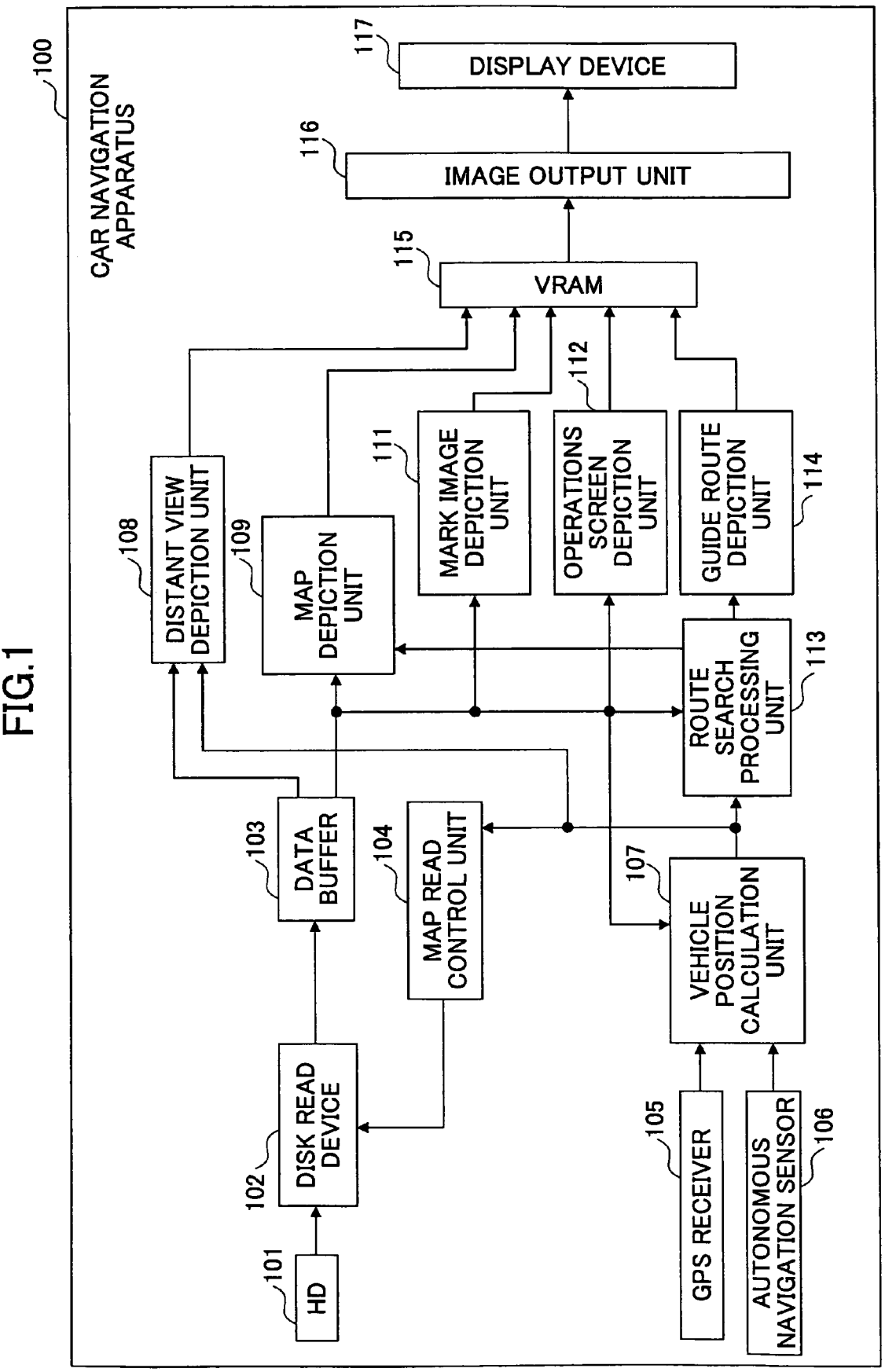
FIG. 1 is a block diagram showing a configuration of a car navigation apparatus according to an embodiment of the present invention.

FIG. 1 is a block diagram showing an exemplary configuration of a car navigation apparatus according to an embodiment of the present invention. The car navigation apparatus 100 shown in FIG. 1 includes a hard disk (HD) device 101 that stores 3D map information (e.g., including graphic information of displayed objects such as icons), a disk read device 102 that reads the map information from the hard disk device 101, a data buffer 103 that temporarily stores the map information read by the disk read device 102, and a map read control unit 104 that controls the reading of the map information by the disk read device 102. It is noted that in certain embodiments, a DVD (digital versatile disk) device and/or a CD (compact disk) device may be used along with or instead of the hard disk device 101. Also, the car navigation apparatus 100 includes a GPS receiver 105 for acquiring position information pertaining to the position of the vehicle in which the apparatus 100 is installed; an autonomous navigation sensor 106 that detects the traveling direction, the accelerating speed, traveling speed, and traveled distance, for example, of the vehicle; and a vehicle position calculation unit 107 for calculating the vehicle position based on the information acquired by the GPS receiver 105 and the autonomous navigation sensor 106. The calculated vehicle position information is input to the map read control unit 104, and in turn, the map read control unit 104 controls the disk read device 102 to read map information of a predetermined area surrounding the vehicle position.

Also, the car navigation apparatus 100 includes a distant view depiction unit 108 that depicts a distant view on a VRAM (video random access memory) 115 based on the map information acquired from the data buffer 103 and the vehicle position information acquired from the vehicle position calculation unit 107; a map depiction unit 109 that depicts images of roads and three-dimensional buildings on the VRAM 115 based on the map information acquired from the data buffer 103; a mark image depiction unit 111 that depicts display objects such as icons on the VRAM 115 based on the map information acquired from the data buffer 103; an operations screen depiction unit 112 that depicts an operations screen on the VRAM 115 based on the map information acquired from the data buffer 103; a route search processing unit 113 that searches for an optimum route to a destination designated by a user based on the map information acquired from the data buffer 103, and the vehicle position information acquired from the vehicle position calculation unit 107; a guide route depiction unit 114 that depicts a guide route on the VRAM 115 based on the optimum route search result; an image output unit 116 that outputs the distant view image, the map image, the display object image, the operations screen image, and the guide route image depicted on the VRAM 115; and a display device 117 that displays a composite image of the output images to be viewed by the user.

FIG. 2 represents an exemplary outer circle distant view pattern management table T1 that is used for distant view depiction by the distant view depiction unit 108 of FIG. 1. FIG. 3 represents an exemplary inner circle distant view pattern management table T2 that is used by the distant view depiction unit 108. The outer circle distant view pattern management table T1 shown in FIG. 2 includes an "ID (prefecture ID)" field, a "prefecture" field, and an "EB (distant view back) pattern" field in which bearings are divided into a predetermined number of bearing regions and a distant view pattern ID (identifier) is assigned to each of the bearing regions as is described below. The inner circle distant view pattern management table T2 of FIG. 3 includes an "ID (city ID)" field, a "city" field, an "EF (distant view front) pattern" field in which bearings are divided into a predetermined number of bearing regions and an inner circle distant view pattern ID (identifier) is assigned to each bearing region as is described below. It is noted that in the present example "prefecture" is a representation of a "wide region", and "city" is a representation of a "region". Specifically, a "wide region" may refer to an upper level government such as a prefecture, a county, a state, or a country, for example. A "region" may refer to a basic lower level (local) government such as a city or a town, for example. A "wide region" is made up of plural "regions" located adjacent to each other. It is noted that a "region" and a "wide region" do not necessarily have to correspond to governments as long as the two have a hierarchical relationship.

Figure 4:
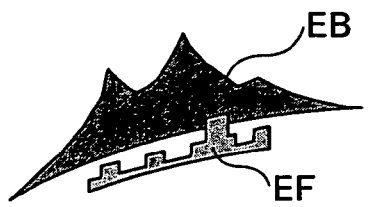
FIG. 4 is a diagram showing an exemplary distant view pattern having a dual structure including an outer circle distant view pattern and an inner circle distant view pattern.

FIG. 4 is a diagram showing an exemplary dual structure distant view pattern including an outer circle distant view pattern and an inner circle distant view pattern. Specifically, the dual structure distant view pattern of FIG. 4 includes an outer circle distant view pattern EB mainly comprising an image of mountains, and an inner circle distant view pattern EF mainly comprising a cityscape (silhouette), for example.

Figure 5:
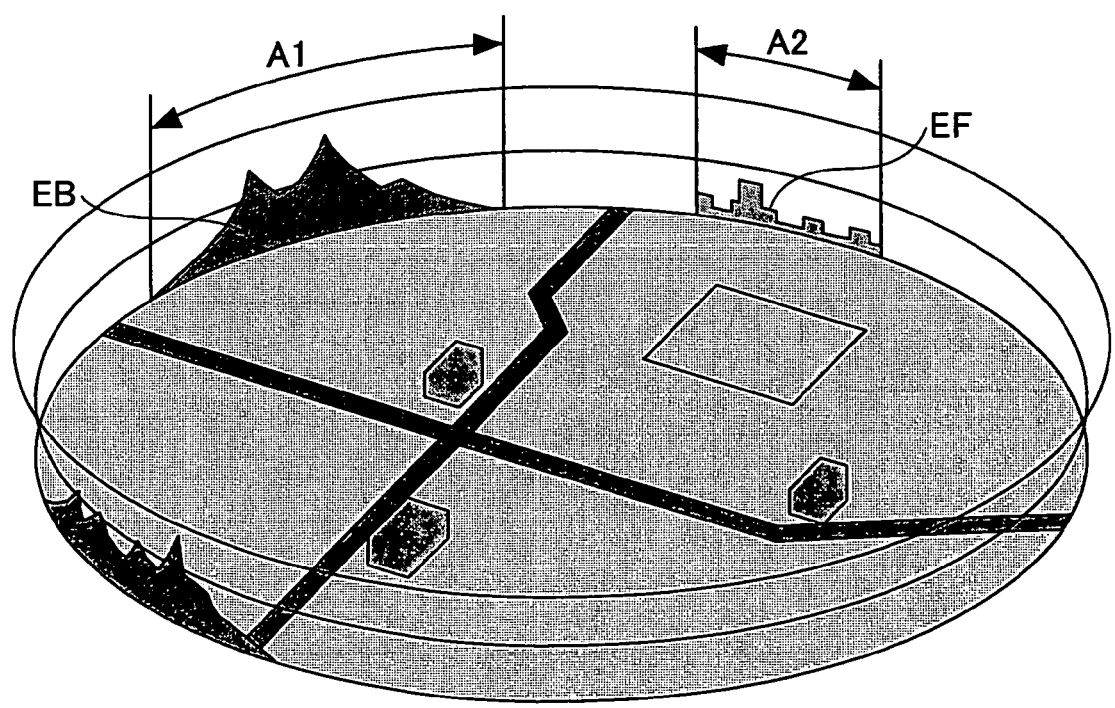
FIG. 5 is a diagram illustrating the bearings of the outer circle distant view pattern and the inner circle distant view pattern.

FIG. 5 is a diagram showing the bearings of an outer circle distant view pattern EB and an inner circle distant view pattern EF. In the illustrated example, bearings are divided into units of bearing regions A1 for outer circle distant view patterns EB, and bearings are divided into units of bearing regions A2 for inner circle distant view patterns EF.

Figure 6A:
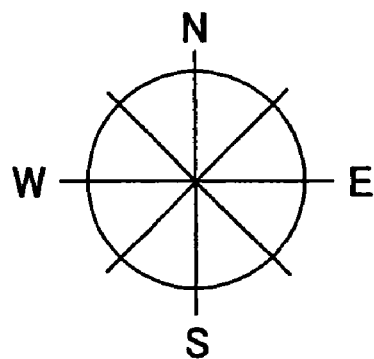
FIGS. 6A and 6B are diagrams illustrating exemplary distant view pattern divisions.
Figure 6B:
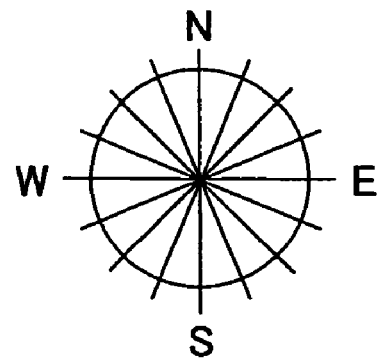

FIGS. 6A and 6B are diagrams showing exemplary distant view pattern divisions. Since changes with respect to bearings may be relatively small for mountains, the outer circle distant view patterns EB may be divided into eight, for example, as is shown in FIG. 6A. Since changes with respect to bearings may be relatively large for cityscapes, the inner circle distant view patterns EF may be divided into sixteen, for example, as is shown in FIG. 6B. However, it is noted that the distant view pattern divisions are by no way limited to the above examples.

Figure 7:
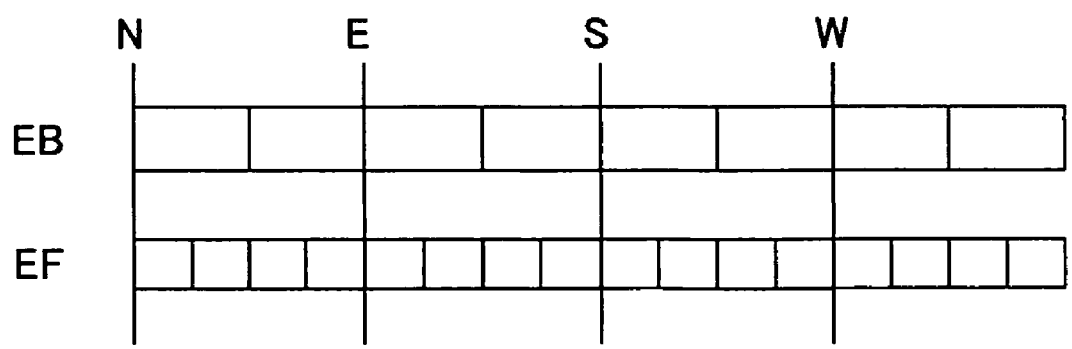
FIG. 7 is a diagram showing an exemplary arrangement of distant view patterns.

FIG. 7 is a diagram showing an exemplary arrangement of distant view patterns. In an embodiment, outer circle distant view patterns EB and inner circle distant view patterns EF for each of plural location points are arranged in order from north (N)→east (E)→south (S)→west (W). It is noted that EB pattern IDs and EF pattern IDs are respectively assigned to the EB patterns and EF patterns of FIGS. 2 and 3 according to the order shown in FIG. 7.

Figure 8:
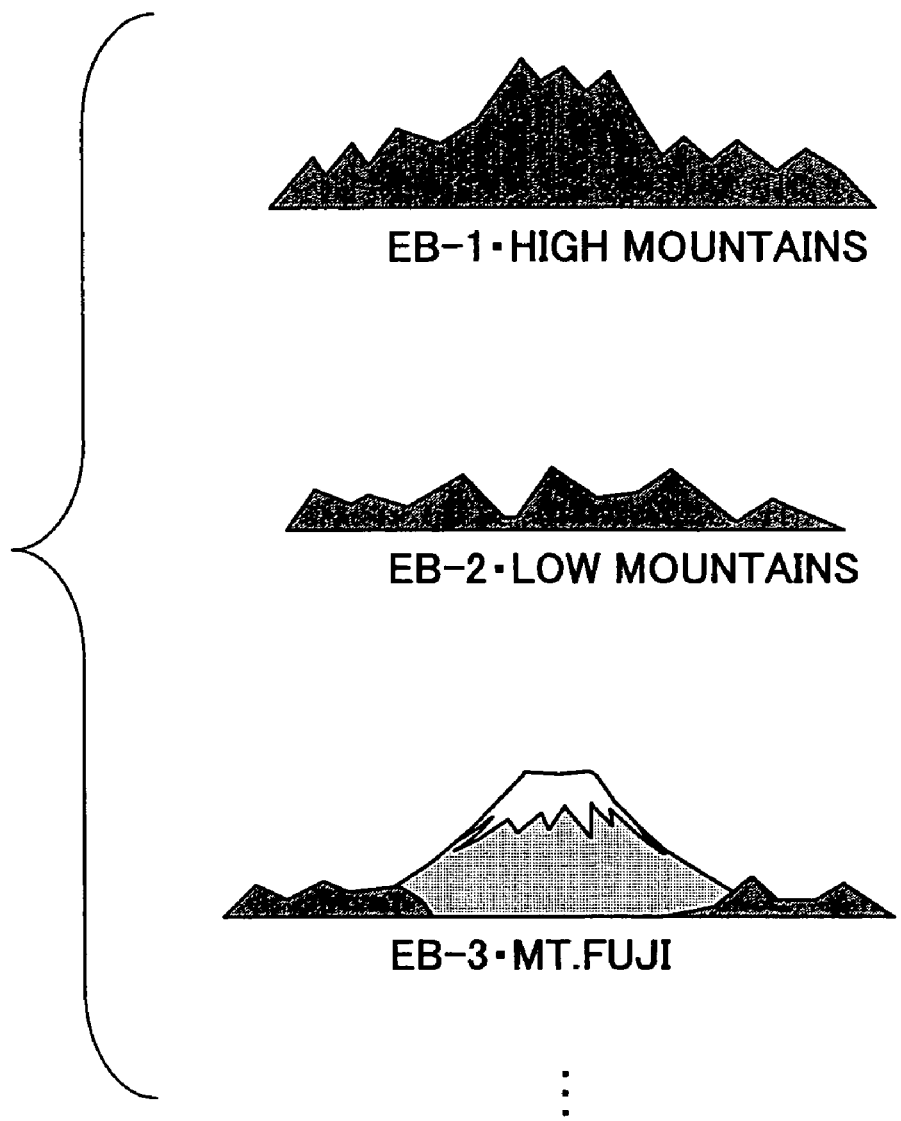
FIG. 8 is a diagram showing examples of outer circle distant view patterns.

FIG. 8 is a diagram showing exemplary outer circle distant view patterns. The exemplary distant view patterns of FIG. 8 as parts to be accommodated within the divided bearing regions includes generic image patterns such as "high mountains" (EB-1) or "low mountains" (EB-2) that may be commonly used for various location points, and images of famous mountains such as "Mt. Fuji" (EB-3) that may be used as a landmark, for example. In this way, distant views closely resembling the actual background scenery of a specific location point may be reproduced. It is noted that when a bearing region corresponds to a location along the sea or a plain with no mountains, a pattern with no mountains may be used, or an outer circle distant view pattern may not be displayed.

FIG. 9 is a diagram showing exemplary inner circle distant view patterns. The exemplary distant view patterns shown in FIG. 9 as image parts to be accommodated within the divided bearing regions include a "cityscape 1 (urban)" (EF-1), a "cityscape 2 (industrial)" (EF-2), a "forest scene 1 (evergreen)" (EF-3), and a "forest scene 2 (deciduous)" (EF-4), for example.

Figure 10:
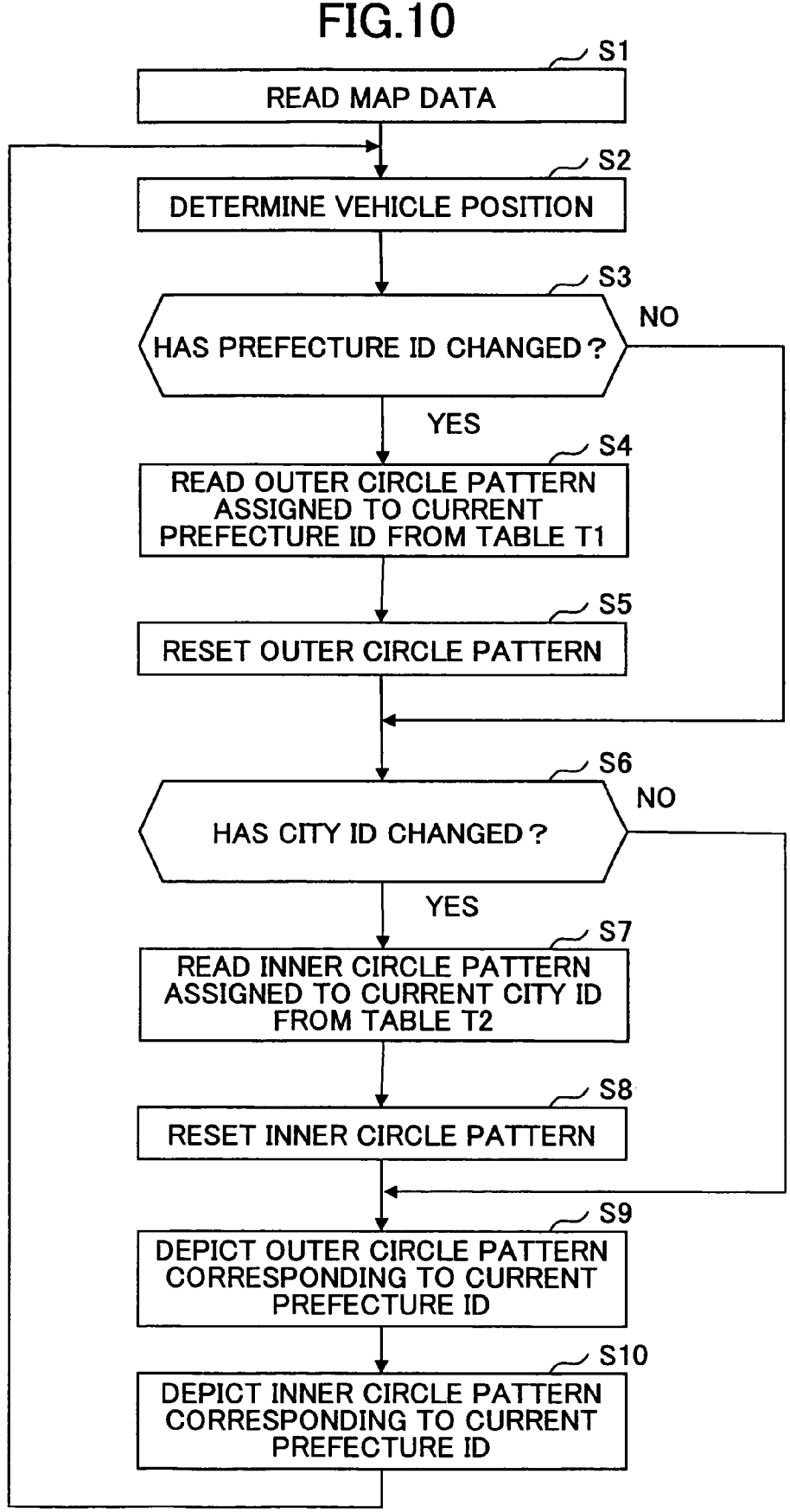
FIG. 10 is a flowchart illustrating an exemplary distant view image display process.

FIG. 10 is a flowchart showing an exemplary distant view image display process that is executed by the distant view depiction unit 108 of FIG. 1 using software (computer program). According to the example of FIG. 10, in step S1, map data are read from the data buffer 103 (see FIG. 1). Then, in step S2, vehicle position information is acquired from the vehicle position calculation unit 107 to determine where the vehicle is positioned. Then, in step S3, a determination is made as to whether the prefecture ID has changed. If the prefecture ID has not changed, the process moves on to step 6 described below. If the prefecture ID has changed, a corresponding EB pattern (outer circle pattern) assigned to the current prefecture ID is read from the outer circle distant view pattern management table T1 (step S4), and the outer circle pattern to be depicted is reset (step S5).

Similarly, in step S6, a determination is made as to whether the city ID has changed. If the city ID has not changed, the process moves on to step S9 described below. If the city ID has changed, a corresponding EF pattern (inner circle pattern) assigned to the current city ID is read from the inner circle distant view pattern management table T2 (step S7), and the inner circle pattern to be depicted is reset (step S8). Then, the outer circle pattern corresponding to the current prefecture ID is depicted (step S9), and the inner circle pattern corresponding to the current city ID is depicted (step S10) after which the process goes back to the vehicle position determination step (step S2).

Figure 11:
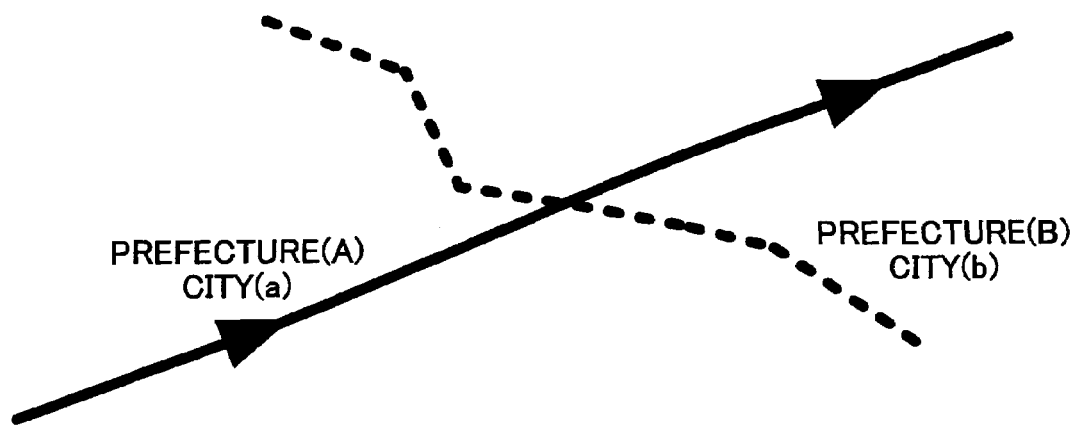
FIG. 11 is a diagram illustrating an exemplary case in which distant view patterns are switched.

FIG. 11 is a diagram illustrating an exemplary case in which distant view patterns are switched. According to this example, in a case where a vehicle is traveling from city (a) of prefecture (A) to city (b) of prefecture (B), a distant view image is depicted with outer circle patterns corresponding to prefecture (A) and inner circle patterns corresponding to city (a), and the distant view image is switched to that depicting outer circle patterns corresponding to prefecture (B) and an inner circle patterns corresponding to city (b) at the point where the vehicle enters city (b) of prefecture (B).

Figure 12:
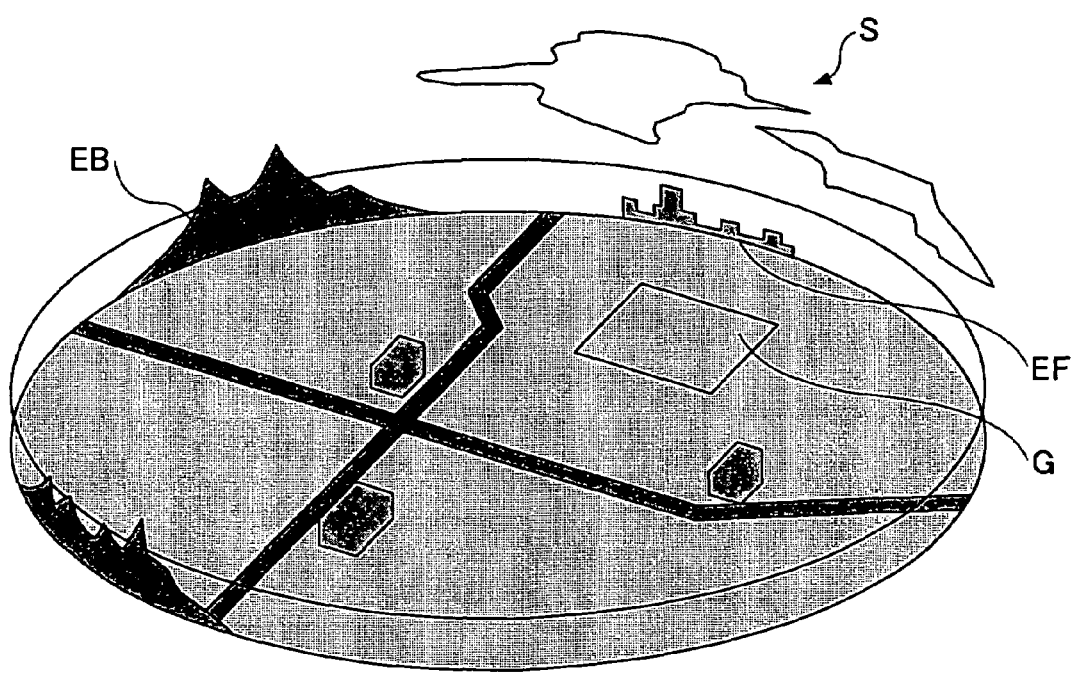
FIG. 12 is a diagram showing an image of the sky with clouds and an image of the ground that are composited with distant view patterns.

FIG. 12 is a diagram showing an image of the sky with clouds and an image of the ground which images are composited with the distant view patterns. Specifically, the image of FIG. 12 includes an outer circle distant view pattern EB primarily comprising an image of mountains, an inner circle distant view pattern EF primarily comprising an image of a cityscape, a ground image G (texture) representing features of the ground (e.g., grass, soil, and water), and an image S of the sky and clouds. In one embodiment, theses images may be switched according to season and the time of the day, for example, in order to realize a more realistic screen display.

It is noted that the distant view image in the above-described embodiment has a dual structure including outer circle distant view patterns and inner circle distant view patterns; however, the present invention is by no way limited to such an embodiment. For example, in a case where the distant view does not have to be displayed in such a detailed manner, only the outer circle distant view patterns may be used. On the other hand, a multi-layer (i.e., three-layer or greater) distant view image may be used when a more detailed distant view is desired. In such a case, the number into which inner distant view patterns are divided is preferably greater than the number into which outer patterns are divided.

As can be appreciated, according to an embodiment of the present invention, divided distant view patterns are provided as parts, and a depicted distant view image is arranged to be switched according to a corresponding prefecture of a current position, for example. In this way, a more realistic distant view may be represented through relatively simple processes and operations. Accordingly, in map depiction of a 3D map for car navigation, an outer edge of a map depiction area may not be represented as a discontinuous horizon line, and a more realistic background image may be depicted outside the depiction area for depicting a map of an area surrounding a relevant vehicle.

It is noted that the above-described embodiment relates to a case of applying the present invention to a car navigation apparatus. However, the present invention is not limited to such an embodiment, and may also be applied to portable navigation apparatuses, simulators, or game apparatuses, for example.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-208758 filed on Jul. 19, 2005, the entire contents of which are hereby incorporated by reference.

What is claimed is:

1. An image processing apparatus that displays a three-dimensional map including displays of a road and a three-dimensional building on a display unit, the apparatus comprising:

a managing unit that divides bearings into a predetermined number of bearing regions and manages identification information of a distant view pattern assigned to each of the bearing regions for each of a plurality of locations;

an acquisition unit that acquires identification information of the distant view pattern assigned to each of the bearing regions for a current location; and a depiction unit that depicts a background image behind a display area for displaying the road and the building based on the acquired identification information of the distant view pattern.

2. The image processing apparatus as claimed in claim 1, wherein the distant view pattern has a dual structure including an outer circle distant view pattern and an inner circle distant view pattern.

3. The image processing apparatus as claimed in claim 2, wherein a first division number into which bearings of the outer circle distant view pattern are divided differs from a second division number into which bearings of the inner circle distant view pattern are divided.

4. The image processing apparatus as claimed in claim 2, wherein the outer circle distant view pattern includes an image of one or more mountains, and the inner circle distant view pattern includes an image of a cityscape.

5. The image processing apparatus as claimed in claim 2, wherein the outer circle distant view pattern is arranged to correspond to a wide region in which the current location resides, and the inner circle distant view pattern is arranged to correspond to a region in which the current location resides.

6. A distant view image display method for displaying a three-dimensional map including displays of a road and a three-dimensional building on a display unit, the method comprising the steps of:

dividing bearings into a predetermined number of bearing regions and managing identification information of a distant view pattern assigned to each of the bearing regions for each of a plurality of locations;

acquiring the identification information of the distant view pattern assigned to each of the bearing regions for a current location; and depicting a background image behind a display area for displaying the road and the building based on the acquired identification information of the distant view pattern.

7. A computer-readable medium storing a distant view image display program for displaying a three-dimensional map including displays of a road and a three-dimensional building on a display unit, the program being executed by an image processing apparatus to perform the steps of:

dividing bearings into a predetermined number of bearing regions and managing identification information of a distant view pattern assigned to each of the bearing regions for each of a plurality of locations;

acquiring the identification information of the distant view pattern assigned to each of the bearing regions for a current location; and depicting a background image behind a display area for displaying the road and the building based on the acquired identification information of the distant view pattern.

* * * * *